Jan. 20, 1948.  F. M. WATKINS ET AL  2,434,654
LIMIT STOP AND FIRE CUT-OFF DEVICE FOR GUN TURRETS
Filed Aug. 26, 1942  3 Sheets-Sheet 1
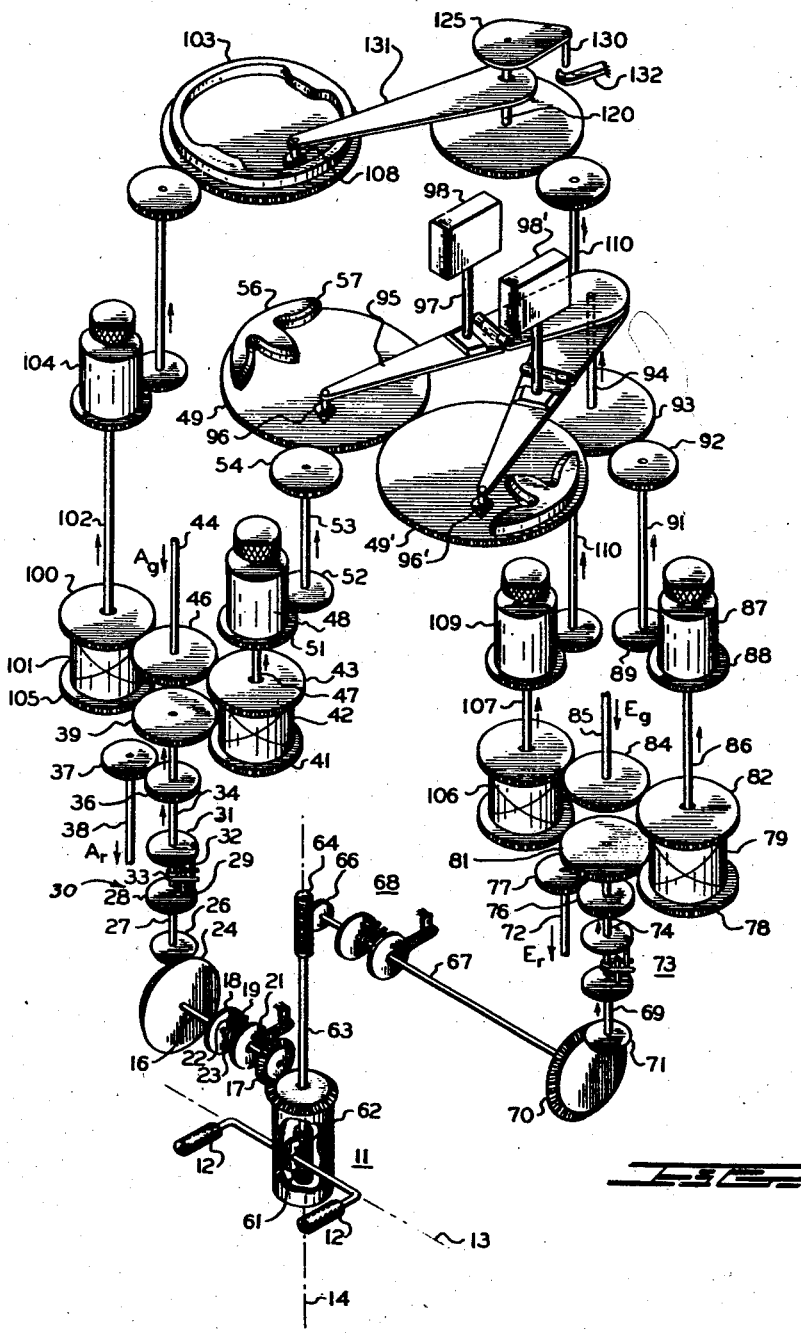
_FIG. 2_
INVENTORs,
FREDERIC M. WATKINS and
CHARLES N. SCHUH Jr.,
BY
Herbert F. Thompson
Their ATTORNEY.

Jan. 20, 1948.    F. M. WATKINS ET AL    2,434,654
LIMIT STOP AND FIRE CUT-OFF DEVICE FOR GUN TURRETS
Filed Aug. 26, 1942    3 Sheets-Sheet 2
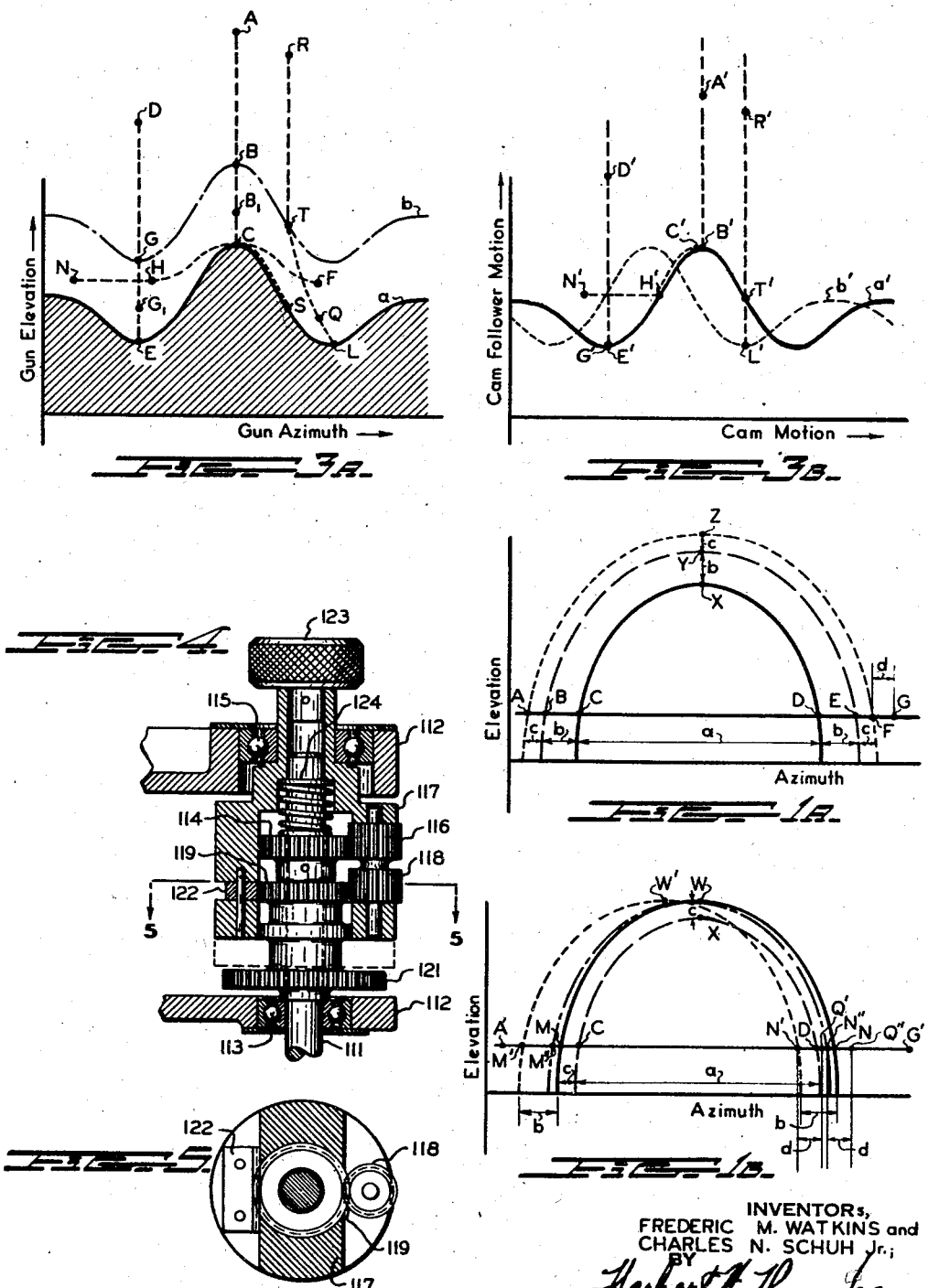
INVENTORs,
FREDERIC M. WATKINS and
CHARLES N. SCHUH Jr.
BY
Herbert T. Thompson
Their ATTORNEY.

Jan. 20, 1948. F. M. WATKINS ET AL 2,434,654
LIMIT STOP AND FIRE CUT-OFF DEVICE FOR GUN TURRETS
Filed Aug. 26, 1942 3 Sheets-Sheet 3

INVENTORS
FREDERIC M. WATKINS
CHARLES N. SCHUH, JR.
BY
THEIR ATTORNEY

Patented Jan. 20, 1948

2,434,654

UNITED STATES PATENT OFFICE 2,434,654

LIMIT STOP AND FIRE CUTOFF DEVICE FOR GUN TURRETS

Frederic M. Watkins, Forest Hills, and Charles N. Schuh, Jr., Bellerose, N. Y., assignors to Sperry Gyroscope Company, Inc., Brooklyn, N. Y., a corporation of New York Application August 26, 1942, Serial No. 456,456

21 Claims. (Cl. 192—138)

The present invention is related to the art including power-operated gun turrets, such as for aircraft, tanks, trucks, etc.

In prior copending Holschuh and Warner application 416,290, filed October 24, 1941, for Power-operated aircraft gun turret, and especially in Fig. 5 thereof, there is shown a limit stop and fire cut-off device for use with aircraft gun turrets. The present invention constitutes an improvement over this portion of the prior copending application. In this copending application, there is shown an aircraft gun turret containing a pair of guns adapted to be oriented both in elevation and azimuth at rates proportional to respective azimuth and elevation components of deflection of a control member. Such gun turrets, when placed on the upper or lower part of the aircraft fuselage, normally have an unlimited range in azimuth, that is, they may be oriented completely around the azimuth circle. In elevation, however, the orientation of the guns must be limited to an arc beginning with the zenith or 90 degree elevation position and terminating at some lower limit of elevation, in the case of an upper turret, for example. Since the guns and turret may be rotated at considerable speed and have considerable mass and inertia, it is desirable to initiate deceleration and stopping of the guns and turret before reaching the absolute limit of orientation permitted by the surrounding structure of the aircraft carrying the turret.

In application 416,290, there is also shown one form of limit stop which initiates deceleration of the guns in elevation upon the attainment of a predetermined elevation dependent upon the rate at which the guns are being driven in elevation. However, in that application the same limit of free motion, that is, the point at which deceleration begins for a particular elevation rate, controls the deceleration action for all orientations of the gun in azimuth, so that the free motion of the guns is restricted to a predetermined conical solid angle.

In many installations, it is possible for the guns to be driven to a lower elevation for particular azimuth orientations than for other azimuth orientations. Thus, for instance, for an upper turret, lower elevations are permitted by the structure of the aircraft for broadside orientations than for longitudinal or fore and aft orientations. In the system of the above-mentioned prior application, however, the elevation limit of free motion, being the same in all azimuthal orientations, would necessarily be determined by the minimum range of variation of elevation, thus preventing the gun from covering the maximum solid angle permitted by its mount.

In the present invention, however, the limit of free motion in elevation is made dependent upon the particular azimuth of the gun orientation, and accordingly permits greater unrestricted range of motion in elevation for certain azimuthal orientations than for others, yielding the maximum use of the gun permitted by its mounting.

In Fig. 5 of the prior copending application, there is also shown a fire cut-off unit adapted to interrupt the firing of the guns in particular zones wherein such firing might be dangerous to the surrounding structure of the aircraft. For example, one particular zone which must be restricted as to firing is that occupied by the tail structure of the craft, which extends considerably above the fuselage body upon which the upper turret is mounted. The particular zone in which fire is to be cut off depends upon several factors in addition to the actual size of the obstructing structure which it is desired to protect from the gunfire, and accordingly, the region in which fire is to be cut off is considerably larger than that occupied by the obstructing structure.

By the present invention this region surrounding the obstruction which the projectile is prevented from entering is made considerably smaller than has been previously possible, without in any way increasing the possibility of damage by gunfire, by the incorporation of certain anticipation effects, whereby the fire cut-off device is actuated in accordance with the rate of motion of the gun in addition to the orientation of the guns, whereas in the prior art exemplified by the prior copending application, only gun orientation was so used.

Accordingly, it is an object of the present invention to provide improved operating systems for power-operated aircraft gun turrets.

It is another object of the present invention to provide improved limit-stop devices for power-operated aircraft gun turrets permitting a greater range of effective use of the turrets.

It is a further object of the present invention to provide improved fire cut-off control devices for aircraft gun turrets adapted to provide a greater range of effective fire from the turrets without increasing the damage hazard.

It is another object of the present invention to provide improved limit-stop devices for power driven aircraft gun turrets wherein the guns are decelerated before reaching the limits of their range of possible orientations, and wherein the decelerating point is made dependent upon both the azimuth and elevation components of the orientation of the guns.

It is still another object of the present invention to provide improved limit-stop devices for power-operated aircraft gun turrets wherein the guns are decelerated before reaching the limits of their range of operation and wherein the points at which deceleration is initiated are made dependent upon the azimuth and elevation components of the orientation of the guns and also upon the elevation and azimuth components of the angular rate of change of the orientation of the guns.

It is a still further object of the present invention to provide improved fire cut-off devices for power-operated aircraft gun turrets in which the interruption of gunfire is controlled both in accordance with the orientation of the guns and in accordance with the angular velocity of the guns.

Further objects and advantages will become apparent from the following specification and drawings, wherein, Figs. 1A and 1B are diagrams explanatory of the operation of the fire cut-off device of the present invention.

Fig. 2 shows a schematic perspective view of the improved fire cut-off device and limit-stop device of the present invention.

Figs. 3A and 3B show diagrams explanatory of the operation of the limit-stop device of the present invention.

Fig. 4 shows a longitudinal cross-section of a setting or adjusting differential useful in the system of Fig. 2.

Fig. 5 shows a cross-section of the device of Fig. 4 taken along lines 5—5 thereof.

Figure 6:
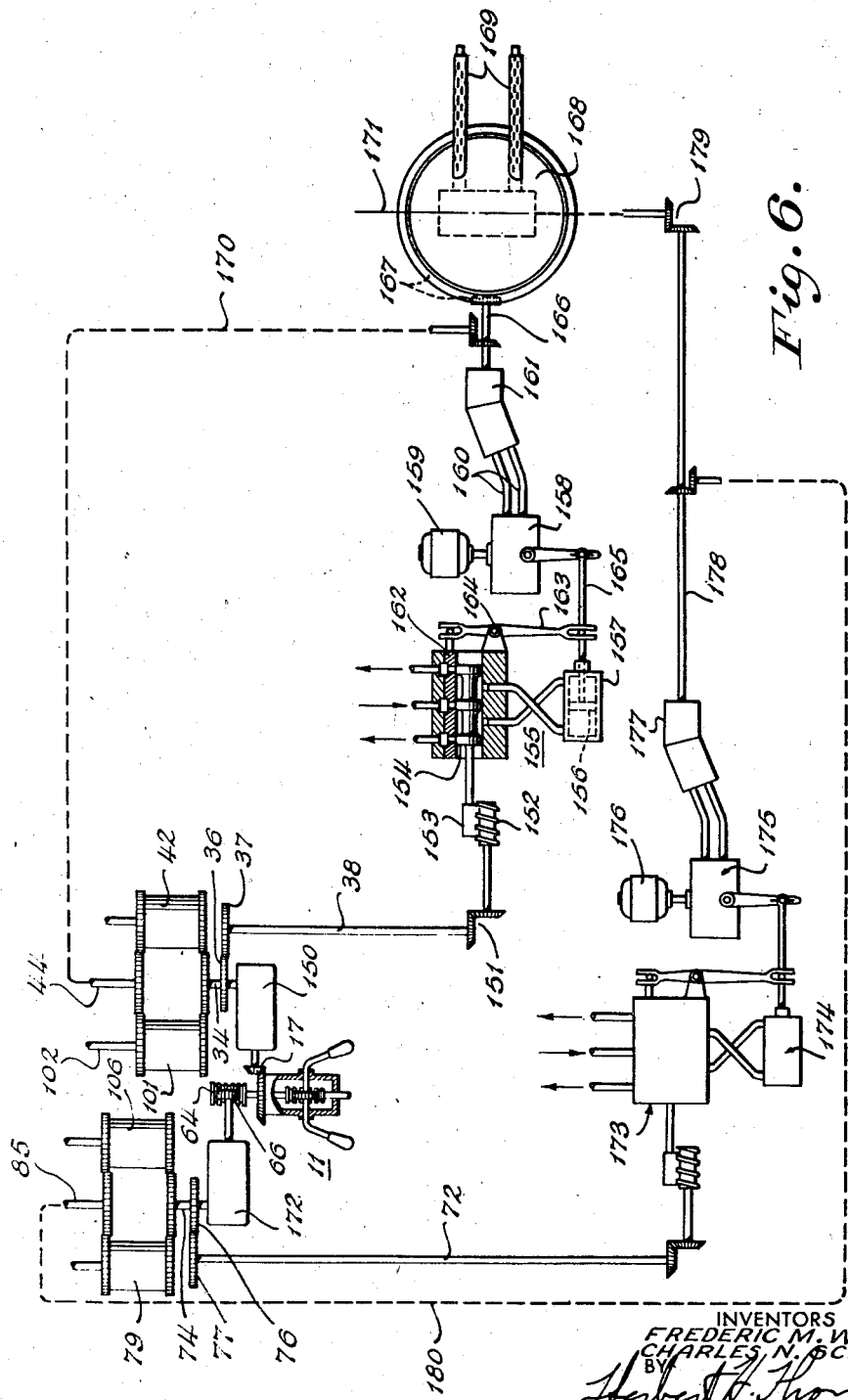

Fig. 6 somewhat schematically illustrates one form of driving means for driving a power operated device in two relatively angularly disposed frames of motion or about two relatively angularly disposed axes and the interconnection therewith of the limit stop mechanism and controller shown in Fig. 2.

Considering first the fire cut-off device, and assuming for the moment that the turret contains only one gun, there are many factors which affect the instant at which the firing of this gun must be interrupted in order to avoid hitting an obstructing portion of the aircraft mounting the turret. In most gun turrets at the present time, firing of the gun is controlled by means of a firing solenoid which is energized by means of a firing key under the control of the operator or gunner. The cutting off of the firing of such a gun is performed by interrupting the energizing circuit to the firing solenoid. In order to determine the instant at which the energization of the firing solenoid must be interrupted in order to avoid any possibility of the projectile hitting the obstruction, the following factors must be considered:

(1) The ballistic deflection of the projectile: As the projectile leaves the muzzle of the gun, it is subjected to a cross-wind, which is derived from the relative motion of the gun and surrounding air at right angles to the path of the projectile. The maximum effect of this cross-wind, of course, will be produced when the gun is firing directly broadside and will decrease as the azimuth angle of the gun orientation varies from broadside to fore or aft. Such a cross-wind tends to deflect the projectile from a straight line path and the firing of the gun must be interrupted for all orientations of the gun differing from the orientation of the obstruction (seen from the gun position) by amounts less than this deflection. In this way the effective size of the obstruction is increased over its actual size by the amount of this correction.

(2) Dispersion of fire: Dispersion of fire results in the production of an unpredictable zone within which the projectile may trace its path. The width of this zone depends upon many indeterminate factors but has an empirically determined average value which must be allowed for.

(3) Calculation of the fire cut-off point: In determining the exact point at which gunfire should be cut off, it is necessary to accurately determine the elevation and azimuth of the outer surface of the obstruction. This is usually done by making calculations from the dimensions of design drawings. Variations in the actual dimensions from the design dimensions and possible error in the computations made therefrom may be appreciable. A further factor influencing this error will be the normal flexure of the airplane structure, such as wing deflection under load, normal movement of the control surfaces, and tail flutter, which may change the actual design dimensions by an indeterminate or only approximately determinable amount. This also must be allowed for.

(4) Back-lash of guns: In driving the guns from the power drive unit, a certain amount of back-lash is to be expected wherein the actual gun orientation will differ from that which it is desired to produce and which is believed to be produced. Such back-lash will depend upon the quality of the construction of the device and upon the amount of wear. Also, the jamming of one gun if several are used may cause a permanent set of the remaining gun or guns in an indeterminate direction against the back-lash. Possible flexure of the turret and supporting structure may also cause a small amount of variation in the orientation of the gun muzzle, which also must be allowed for.

(5) Accuracy within the fire cut-off unit: Since the fire cut-off units are essentially cam-operated devices, as will be seen, a certain amount of inaccuracy or tolerance in the manufacture of the cams and their followers is to be expected, which may add a fixed amount to the indeterminate variation of the limits of the gun orientation for fire cut-off.

(6) Set up and adjustment: In aligning the gun orientation and the fire cut-off control system, a certain amount of error is to be expected depending upon the amount of care which is taken in setting up the adjustments and in the accuracy with which such adjustments can be made.

(7) Lag error: This is probably the largest error to be encountered and is due to the fact that even after the solenoid energization circuit is interrupted, a finite time interval must elapse before the gun firing is actually prevented. This time interval depends upon several factors including the rapidity of response of the firing solenoid and the particular point of the firing cycle of the gun mechanism at which the firing solenoid operates to latch the mechanism. During this time interval, the gun continues to change its orientation at the particular angular rate at which it is tracking, and accordingly, provision must be made to allow for the biggest possible change in gun orientation at the highest possible angular rate during this operating interval. An additional factor which may be grouped with this lag error arises from the fact that the linear velocity of the gun muzzle tip is impressed upon the projectile and accordingly the projectile is given a transverse velocity corresponding to the linear velocity of the gun muzzle tip. During the time in which the projectile travels from the gun muzzle past the obstructing surface, this cross velocity may produce an appreciable deflection of the projectile from what its path would be at zero angular rate of the gun.

The over-all effect of all these factors makes it imperative to interrupt the energization of the firing solenoid at a point in advance of the actual orientation of the obstructing surface from the gun turret position, in order to assure that none of these factors, singly or in combination, will cause the projectile to hit the obstruction. This over-all correction or clearance angle may amount to as much as one or two degrees. Since the correction must be supplied for either direction of rotation of the gun turret, it will be clear that a firing dead area is necessarily present, in addition to that offered by an obstruction, of an amount which is twice the clearance angle.

Furthermore, considering for the moment that the gun has a particular angular velocity of sweep past the obstruction, it will be seen that if the firing solenoid has been deenergized in advance of the surface of the obstruction by the amount of the clearance angle, the solenoid will not be re-energized until the obstruction has been passed by this same clearance angle since the system must operate the same for either sense of angular velocity. But even after the firing solenoid is re-energized, the projectile may still be subject to the lag error caused by the firing cycle time, which may amount to nearly half the total clearance angle for full angular rate, and therefore the projectile may not be fired any closer to the surface of the obstruction than approximately one and a half times the clearance angle when the gun is receding from the obstruction. Hence, in addition to the obstruction itself, there is necessarily present a dead area approximately two and one-half times the clearance angle, which dead area under some circumstances may approach as much as 5 degrees. Such a large dead area is extremely disadvantageous since it renders the craft more susceptible to attack, especially in the tail of an aircraft, wherein the tail itself may occupy 2 degrees, resulting in an overall dead area of nearly 7 degrees.

In prior systems, the firing solenoid was deenergized in advance of the obstructing structure by an amount corresponding to the clearance angle determined for the largest possible angular velocity of the gun, and was re-energized after the gun passed the obstruction by an amount corresponding to this same clearance angle, thus necessarily providing the dead area just described. In the present invention, it has been found satisfactory to resolve the clearance angle into two components, one of which is relatively independent of gun velocity and the other proportional to gun velocity. It will be seen that the velocity-independent component will depend upon the first six factors discussed above, whereas the velocity-dependent component depends mainly upon the seventh factor. These two components are approximately of equal magnitude. By the present invention, the velocity-independent clearance angle is provided for movement of the guns both approaching and receding from the obstruction, as in prior systems. To this fixed clearance angle component is added a second component made directly proportional to the angular velocity of the gun, but only when approaching the obstruction. For maximum angular velocity of the gun, the total clearance angle obtained while approaching the obstacle is made the same as that in prior systems so that no safety is sacrificed. For lower velocities of the gun, however, the clearance angle provided by the present invention still will be materially decreased with respect to that of prior systems, since the second component will be lower, resulting in a decrease of the zone of dead fire, also without sacrificing safety.

In addition to this, the present invention provides means for overcoming the possible lag in resuming fire after the obstruction has been passed. As discussed above, in prior systems where fixed clearance angle is provided, the effective angle of dead fire after passing the obstruction might be as much as the clearance angle (which includes the lag error) plus the lag error due to the resumption of firing. However, when receding from the obstruction, the lag error allowance is no longer needed, since all the effects producing the lag error are in a sense to increase the safety of firing. In fact, the lag error may be utilized as a safety factor. In the present invention, the gunfiring mechanism is made to anticipate the clearing of the dead zone comprising the obstruction plus the fixed component clearance angle by an amount proportional to the lag error, whereby the actual zone of restricted fire after clearing the obstruction is reduced to the actual fixed clearance component, eliminating the now useless lag component and reducing the dead zone. It will be seen that this is possible, since, although the lag error for a fixed velocity while approaching the target is indeterminate, depending on the portion of the firing cycle during which the fire cut-off operates, the lag error for this velocity while receding from the target is perfectly definite, being the fixed time between re-energization of the firing solenoid and the firing of the gun.

This is done in the present case by providing a fire cut-off cam adapted to interrupt the energization of the firing solenoid for an angular range equal to the angular width of the obstruction plus the velocity-independent component of the clearance angle on either side thereof, thereby providing control by the fixed clearance angle. In order to adjust the fire cut-off point in accordance with the angular velocity of the guns and hence in accordance with the lag error, the fire cut-off cam is advanced in position by an amount proportional to the angular velocity of the gun, the proportionality factor being so selected that, at full angular rate, the cam will be advanced by an amount corresponding to the full lag error of prior systems. Since the cam is thus advanced, fire cut-off will be initiated in advance of the obstruction by the amount of the fixed clearance angle plus the amount of the velocity-dependent lag error (which is the same as in prior systems for full rate), and also firing will be resumed at a point after clearing the obstruction by an amount equal to the fixed clearance angle component less the amount of the velocity-dependent lag error component.

The above considerations will be made clearer by reference to the diagram of Fig. 1A, which shows an elevation-azimuth plot, each point of which represents an orientation of the gun. The heavy full line CXD shows the outline of the obstructing structure, which, for example, may be the tail structure of the aircraft subtending an angle $a$ in azimuth at the gun. Correspondingly, the shaded area in Fig. 3A indicates the assumed orientations in which no projectile is to be allowed.

If the velocity-dependent component of the clearance angle at full gun rate in azimuth is denoted by $b$, then dashed line BY shows the gun orientations at which the firing solenoid must be deenergized to avoid any possibility of damage to the obstruction when using full right azimuth rate. A similar line EY applies for full left azimuth rate.

If the fixed velocity-independent component of the clearance angle is denoted by $c$, then dotted line AZF represents the total clearance angle $(b+c)$ arranged symmetrically about the full line curve CXD. In reality, the dotted curve AZF represents the minimum clearness for any movement of the gun in azimuth, or for simultaneous azimuth and elevation movements of the gun in radial directions and toward the center of curvature of these curves, the curve AZF being the locus of points at which energization of the firing solenoid must be interrupted, as the gun follows the above noted paths of movement toward the center of curvature of the curves, in order to insure that none of the clearance angle factors discussed above, together with the lag error, can possibly carry the projectile into the restricted zone CXD.

The prior art fire cut-off cam, such as exemplified by the above-mentioned copending application, Serial No. 416,290, would be formed as shown by the dotted line AZF. Thus, if the gun were moving at full rate in azimuth only, as indicated by the line AG, point C represents the orientation along which it is essential that no projectile shall pass. In order to assure that this condition obtains, and because of the indeterminate factors (1) and (6) and the lag error discussed above, it is necessary to stop the firing of the gun at least as early as the orientation indicated by point A.

Accordingly, as the gun sweeps from left to right, at point A the fire cut-off cam must interrupt the firing solenoid energization circuit. Since it is necessary to allow for tracking of the gun in both directions, it will be clear that in the prior art the firing solenoid can become re-energized only at the point F corresponding to point A, but spaced on the other side of the obstruction by the amount or angle $(b+c)$. Due to the lag error arising from the necessary delay between re-energizing the solenoid and the firing of the guns, already discussed, the gun will recommence firing only after it reaches point G, which is separated from F by the angular amount of the firing lag error $d$. In this manner, in the prior art, a maximum dead area corresponding to the difference in angular orientations of points A and G will be obtained.

By the present invention, the cam surface is designed as shown in Fig. 1B to correspond to the heavy outline MWN separated from the obstruction indicated by the dashed line CXD only by the amount of the fixed component $c$ of the clearance angle. Assuming again that the gun is tracking at full rate from left to right along the line A'G', the fire cut-off cam will be advanced according to the invention to meet or anticipate the motion of the gun by the amount of angle $b$, and accordingly the cam will assume the position shown by the dotted line M'W'N', the forward edge M' of which, for full angular rate of motion of the gun, is at the same position as point A of Fig. 1A, but for smaller rates, lies proportionately between M' and M. It is at M' that the firing solenoid is deenergized, so that, on the approach side, the fire cut-off device of the invention provides just as much protection as in the prior art. The gun remains disabled until point N', representing the rear edge of the effective area of the fire cut-off cam, is reached. At N' the firing solenoid is once more energized and at Q', separated from N' by the firing lag angle $d$, the gun will resume firing. Accordingly, at the maximum angular rate of motion of the gun, the maximum possible dead area will be represented by the interval between orientations M' and Q'. It will be seen, therefore, that the dead area has been reduced by an amount equal to the sum of the velocity-dependent clearance angle or lag error $b$ when measuring from the point of cut-off of the firing solenoids to the angle or direction of the bullets when firing is resumed.

It will be clear that for tracking of the gun in the reverse direction, the cam MWN will be shifted in the reverse sense again to meet or anticipate the motion of the gun, and the same action will take place.

The above analysis was based on the assumption that the gun was tracking in azimuth at maximum velocity. Let it be assumed now that the velocity of the gun is substantially less than its maximum, for example, at a very slow rate close to zero. This situation is also shown in Fig. 1B. In this case, the forward edge M of the effective area of the fire cut-off cam is only slightly advanced to M'', and the energization of the firing solenoid is not interrupted until point M'' is reached. The energization of the firing solenoid is resumed when point N'' is reached and the gun will resume firing at Q'' displaced therefrom by the angle $d$. Here again the maximum dead area has been reduced from AG of Fig. 1A to M''Q'' of Fig. 1B or substantially by the angle $b$ when considered as above set forth in connection with the reduction in the dead area under maximum azimuth velocity conditions.

It will be noted that, with the assumed values of $b$ and $c$, point N' at which the firing solenoid is re-energized, corresponds to a gun orientation directed toward the obstruction CXD. It will be clear that for other values of $b+c$ this will not be the case. However, in any event, no hazard is introduced thereby, since the firing lag angle $d$ and many of the allowances added for safety when approaching the obstruction remain of the same sign when receding therefrom, and become safety allowances on the receding side, permitting the re-energization of the firing solenoids before D is reached without materially decreasing safety or increasing the danger of damage.

Although the above discussion was made relative to azimuth motion only, it will be clear that the same system can be applied to the elevation coordinate also, by advancing the cut-off cam in elevation proportional to elevation rate or, what is the same thing, by so advancing the cam follower, whereby the advantages of the present invention may be obtained for elevation or azimuth motion or any combination of the two.

In this manner, the zone of restricted gun fire caused by an obstructing surface of the aircraft is materially reduced over that of prior art systems without in any way increasing the danger of harming the obstructing surface by the projectile.

The above analysis applies to the case where a turret mounts only a single gun. However, in most present-day gun turrets, two or more guns are usually provided. In order to further decrease the zone of restricted fire, each of these guns is made independently controllable by a fire cut-off device of the type just described. Accordingly, the zone of restricted fire is further reduced by the fact that in certain portions of the restricted fire zone of one of the guns, the other guns, by virtue of their usual lateral displacement with respect to the first gun, will be able to fire, and therefore at least a partially effective gunfire will be provided during a part of this restricted firing zone of the first gun.

As a result, the overall restricted firing zone is substantially decreased. In this way, an overall restricted or dead zone of approximately six or seven degrees may be reduced by the present invention to as little as one degree, providing much more effective protection of the craft carrying the guns, as is to be desired.

Fig. 2 shows a schematic perspective view of a preferred embodiment of the system of the present invention incorporating the principles just discussed. In this figure, a manual control device 11 is provided in the form of handle bars 12 capable of independent rotation about two axes 13 and 14 representing the elevation and azimuth control axes, respectively. Considering, for the moment, rotation of handle-bar control 12 about azimuth axis 14, any displacement of handle-bar 12 about this axis serves to rotate a shaft 16 driven therefrom through bevel gearing 17 by an equivalent amount. Fixed to shaft 16 is a disc 18 carrying a pin 19. Cooperating with disc 18 is a fixed similar disc 21 carrying a second pin 22. Pins 22 and 19 are normally urged together by means of a scissors-type spring 23, which thereby serves to recentralize handle-bar control 12 when the control is released. Shaft 16 operates through gears 24 and 26 to rotate a further shaft 27 to which is fixed a disc 28 carrying a pin 29 and which forms one part of a flexible coupling indicated generally at 30. Disc 28 cooperates with a further disc 31 carrying a pin 32. A scissors spring 33, similar to spring 23, urges pins 29 and 32 together. Spring 33 is made very strong so that, normally, any rotation of disc 28 and pin 29 will produce a corresponding rotation of disc 31 through spring 33 and pin 32, but a strong force on disc 31 may rotate this disc despite any displacement of control 12, thus providing a flexible coupling. Fixed to disc 31 is a shaft 34, which, through gearing 36 and 37, correspondingly rotates a shaft 38. Shaft 38 is connected to the input of the power drive unit for the turret in azimuth. Preferably this drive unit is made of the type in which a given displacement of the control member, as by means of shaft 38, will produce a corresponding angular velocity of the turret. Such drive units may be of the well-known Vickers unit type, as shown in the above-mentioned copending application Serial No. 416,290. In this manner, a given displacement of control 12 about its azimuth axis 14 will produce a corresponding angular velocity of the gun turret. If desired, a non-linear linkage could be inserted between manual control 12 and shaft 38 to provide any desired relationship between the displacement of control 12 and the resulting angular velocity of the turret. For example, it may be desirable to provide a small change in velocity per unit displacement of control 12 near its neutral position, and larger changes for unit displacements of control 12 farther from its neutral position.

The angular displacemment of shaft 38, representing, as has been described, the angular velocity or the angular rate of the gun turret in azimuth, is fed by means of a gear 39 to one input member 41 of a differential 42. A second member 43 of differential 42 is angularly displaced in proportion to the azimuth orientation or azimuth position of the gun turret by way of a shaft 44, suitably actuated from the azimuth control of the turret, and a gear 46 meshing with member 43. In this manner, the third member 47 of differential 42 is angularly displaced in proportion to both the angular rate and the angular position of the gun turret in azimuth.

Member 47 operates through a setting or adjusting device 48, shown more in detail in Figs. 4 and 5, to rotate the fire cut-off cam 49 by means of gears 51, 52, shaft 53 and gear 54. It will be understood that a similar setting device may be inserted in shaft 44, if desired.

As shown, fire cut-off cam 49 carries a raised portion 56 joined to the main body of the cam 49 by means of a bevelled portion 57. In this manner, cam 49 is rotated in correspondence with the azimuth orientation of the guns and the position of the cam is advanced with respect to the gun orientation by an amount proportional to the angular rate of the gun in azimuth. The proportionality factor here is so chosen that at the maximum angular rate, the angular advance of the cam thus produced will be equal to the lag error discussed above. Any other desired proportionality factor could be used, however. Also, although cam 49 is illustrated as a flat rotatable cam, it is to be understood that any other type of cam may be used here.

In a similar manner, rotation of manual control 12 about elevation axis 13 serves, by means of a pinion 61 and circular rack 62, to translate a rod 63 which carries a second circular rack 64 meshing with a pinion 66. In this manner, pinion 66 is rotated by an amount corresponding to the displacement of manual control 12 about elevation axis 13. Pinion 66 is fixed to a shaft 67 provided with a spring centralizing device 68, similar to that described with respect to the control in azimuth. Shaft 67 actuates a further shaft 69 by way of gears 70 and 71 and thereby further actuates the elevation rate control 72 by means of a flexible coupling 73 similar to that described with respect to the azimuth axis, shaft 74 and gears 76 and 77. Elevation control shaft 72 is connected to the input of the elevation power drive unit, which is preferably similar to that of the azimuth power drive unit, and thereby produces an angular elevation rate proportional to the angular displacement of shaft 72.

This angular displacement is fed into one input member 78 of a differential 79 by way of a gear 81. A second member 82 of differential 79 is actuated in accordance with the elevation component of the orientation of the guns by way of shaft 85 and gear 84. Shaft 85 may have a setting device similar to 48 inserted therein. The third or output member 86 of differential 79 is thus displaced in correspondence with the orientation of the guns in elevation and with an angle of lead or advance proportional to the angular rate of the guns in elevation. Shaft 86 operates through a setting device 87, shown in Figs. 4 and 5, similar to device 48, and through gearing 88 and 89, shaft 91, gearing 92, 93 and shaft 94 to rotate arm 95 carrying cam follower 96. In this manner, the radial position of cam follower 96 with respect to cam 49 is controlled in accordance with the orientation of the guns in elevation, but advanced with respect thereto by an amount proportional to the elevation rate of the guns. This proportionality factor is so selected that at maximum elevation rate the angle of advance is equal to the maximum lag error in elevation, as discussed above.

The raised surface 56 of cam 49 and cam follower 96 are so shaped and adjusted that follower 96 will be raised by the beveled section 57 of cam 49 at the instant at which deenergization of the firing solenoid is desired in accordance with the considerations discussed above. Raising of follower 96 serves to lift rod 97, which thereby actuates the cut-off switch 98 to interrupt the firing solenoid circuit.

Cam 49 and follower 96 may serve to cut-off the firing of all guns in the particular turret being controlled. Preferably, however, as discussed above, where a plurality of guns are used, each gun is separately cut off and cam 49 may then serve merely to cut-off fire from one gun. For other guns in the turret, further cams such as cam 49', having a follower 96' actuating a further cut-off switch 98' may be provided. It will be clear that the cut-off positions of cams 49 and 49' will differ slightly due to the fact that their respective guns are necessarily laterally or otherwise offset in their mountings in the turret. As discussed above, the fire cut-off cams 49 and 49' are formed to include only the fixed component of the clearance angle, and are advanced with respect to the orientation of the gun by an amount proportional to the angular rate of change of the gun orientation, whereby the decreased zone of restricted fire discussed above is obtained by the present invention.

Although the fire cut-off device of the present invention has been specifically described as applied to an electrical control of the firing of the guns, it is to be understod that the same principles may be applied to hydraulic, mechanical, or other control of the firing of the guns.

Also actuated from shafts 44 and 34 is a second differential 101 whose output member 102 serves to position a limit stop cam 103 through a setting device 104, shown in Figs. 4 and 5. Cam 103 may be of any suitable type, and need not be the type here illustrated. In this way, cam 103 is positioned in accordance with the angular position of the guns in azimuth, but advanced with respect thereto by an amount proportional to the azimuth rate of the guns.

Also actuated from shafts 85 and 74 is a second differential 106, whose output member 107 actuates the cam follower 108. Thus, the displacement of member 107 serves to correspondingly displace shaft 110 which correspondingly rotates a further shaft 120 to which is fixed a member 125 carrying a pin 130. Rotatably supported on shaft 120 is the arm 131 carrying cam follower 108. Thus, it will be seen that cam follower 108 is entirely free except when pin 130 engages arm 131. By so doing, cam follower 108 is forced toward and against the cam surface 103 to provide the operation to be described.

It will be noted that a fixed stop 132 is provided which cooperates with pin 130 in its opposite extreme position corresponding to maximum elevation, which operates to decelerate and stop the elevation motion of the gun upon reaching the uppermost limit in elevation in the manner already described with respect to the above-mentioned copending application No. 416,290.

In this way the cam follower is angularly adjusted about shaft 120 in accordance with the orientation of the guns in elevation, but advanced with respect thereto by an amount proportional to the elevation rate of the guns.

The above description applies to the control mechanism when within the desired free range of control. However, in all turrets of the present type, there is a definite limitation to the range of possible orientations because of the manner of mounting. Thus, the top turret or the bottom turret may be unrestricted in motion in azimuth but carry a variable restriction of approximately zero to plus or minus 90° in elevation, the lower value of elevation depending on the azimuth component of the orientation. Nose, tail and wing turrets on the other hand, are restricted both in elevation and azimuth and are therefore useful only in restricted solid angles of possible orientations. In order to prevent any damage to the gun or turret mounting when the gun is moved to its extreme positions, apparatus must be provided to decelerate and stop the turrets before reaching these extreme positions.

Referring to Fig. 3A, a plot of the extreme positions of a representative gun is shown by the curve $a$. Thus, each point of this figure represents a particular gun orientation, that is, a particular combination of azimuth and elevation. All points above curve $a$ represent permissible gun orientations. All points below, in the shaded area, represent forbidden gun orientations. The particular curve $a$ shown may correspond, for example, to an upper turret, where, along the fuselage (0° or 180° azimuth) the gun may be depressed less than for broadside directions (90° or 270° azimuth).

If, for illustration, a gun is oriented in elevation and azimuth corresponding to point A, and if only the elevation of the gun is changed, the locus of points corresponding to the successive gun orientations will be line AC. If the gun is being driven downward at the full elevation rate, it is desirable to start decelerating at some point B before the extreme position C is reached so that the gun may be slowed down and stopped upon reaching point C, even though the manual control 12 is still "ordering" further down elevation rate. However, if the gun is being driven downward at only partial elevation rate, it is not necessary to start decelerating at point B but only at point $B_1$, if the same average deceleration is used. It will be clear that it is desirable to utilize the maximum deceleration made possible by mechanical considerations, in order to increase the fire range as much as possible.

If the gun, on the other hand, started from a position of D and traveled down in elevation, its deceleration, if at full rate, should start at point G or if at partial rate, at $G_1$, in order to stop at E.

In effect, if it is desired to indicate the locus of points where deceleration should start, then the requirements just illustrated may be interpreted as bodily moving curve $a$ upwardly and in an amount proportional to down elevation rate, into position $b$ if full elevation rate is used, which curve is then the desired limit of free motion (free from limit-stop action) of the gun or the locus of points where deceleration starts.

It will be clear that similar requirements are involved in motion in azimuth only, especially for turrets having restricted azimuth ranges, such as nose, tail or wing turrets. For motion in azimuth, the locus of points at which deceleration must start may be considered to be derived by moving curve $a$ to the right or left, by an amount proportional to the left or right gun azimuth rate ordered. For combinations of azimuth and elevation motion, the curve $a$ moves up or down and right or left corresponding respectively to the gun elevation and azimuth rates.

A further special requirement arises for conditions where the gun is already at the limit and further motion is ordered by the manual control. Thus, if the gun is at point S, it is clear that down-elevation rate alone must be prevented or rendered ineffective, and left-azimuth rate alone must be prevented or rendered ineffective, since otherwise the gun would run into the fuselage. However, down-elevation rate must be permitted if accompanied by suitable right-azimuth rate, and the amount of down-elevation rate must be proportioned to the amount of right-azimuth rate, in order that the gun may proceed along S—L. Similarly, left-azimuth rate should be permitted if accompanied by a suitable value of up-elevation rate.

It is also desirable that the gun should accurately follow the "order" from the control, at least in one coordinate, even though not in the other coordinate, since then the gun will be in the best position for resuming correspondence with the ordered orientation when that ordered orientation reaches the zone of permissible orientations for this particular gun. Hence, it is desirable that, for instance, with the gun at point H and right-azimuth rate is ordered, the gun follow the order in azimuth. This can be safely done only by forcing the gun upward in elevation to follow the curve from H to C, even if the ordered elevation rate remains downward or less than that necessary to climb slope HC. Hence, in some way, azimuth rate and displacement must produce the desired elevation rate, or vice versa.

A further desirable feature may be illustrated by assuming the gun to be at rest at point C. The ordered elevation rate may try to drive the gun down, but the limit-stop must prevent this action. If it is desired to traverse successive gun positions corresponding to points along the limit curve $a$ from C to S, right-azimuth rate will be ordered. Ordinarily, this will cause the gun to move in azimuth, but motion in elevation cannot take place (assuming the above desirable characteristics to be present) until the gun has moved away from the limit curve $a$. Hence, the path of the gun would be along CF. To traverse CS, the elevation rate control must anticipate the azimuth motion, whereby elevation and azimuth motion may occur together along CS. This may be done by effectively shifting the limit curve horizontally to the left, to position $b$ (Fig. 3B), proportionally to azimuth rate. In this way, the down-elevation rate control is released, or allowed to become at least partially effective, permitting motion from C to S.

It will be clear that the characteristics obtained by interchanging elevation and azimuth in the above discussion are also desirable and should be provided.

From the above discussion of desirable characteristics, it will be clear that the limit-stop mechanism must be controlled by azimuth rate and elevation rate as well as gun azimuth and gun elevation. This is done in the present invention by control of limit cam 103 from azimuth rate as well as gun azimuth position, and its follower 108 from elevation rate as well as from gun elevation position. It will be clear that cam 103 may be controlled by the elevation data, and follower 108 by azimuth data, if desired.

Cam 103 is formed as an approximate polar coordinate chart of the free area of the guns, that is, the region in which the limit-stop device described is desired to be ineffective. In this plot, angular displacements about shaft 120 as a center represent elevation angles, and angular displacements about the center of cam 103 represent azimuth angles of the gun orientation. The cutout portion of the cam then represents all the region of free motion of the guns. Curve $a$ of Fig. 3A shows the corresponding rectangular coordinate plot of the cam.

Assume, for the moment, that the guns are moving downwardly in elevation only, as along AC or DE in Fig. 3A. Cam 103 will be stationary and shaft 120 will be rotating in correspondence with the position of the guns in elevation, but advanced with respect thereto by an amount proportional to the rate of change of elevation. This proportionality factor is so chosen that the amount of advance thus produced at maximum elevation rate will be equal to the angle at which it is desired to initiate deceleration in advance of the actual mechanical limit. This angle is selected from considerations of mechanical strength and desired decelerations for the gun. It will be seen that arm 131 may be considered as fixed to shaft 120, since its floating connection is merely to permit suitable gear ratios to be used without causing the follower to hit back of the cam.

Accordingly, assuming the gun traveling downwardly at full elevation rate along AC, when the gun reaches the point where deceleration is to be initiated (point B), cam follower 108 will just come into contact with the raised portion of cam 103, since this portion of cam 103 represents the ultimate limit of free motion of the gun, and follower 108 has been advanced with respect to the position of the gun (point B) by the amount of this decelerating angle (BC).

Fig. 3B shows the positions of the cam follower 108 (or shaft 120) relative to cam 103, corresponding to the gun positions of Fig. 3A. Thus, while the gun moves from A to B (Fig. 3A), follower 108 moves from A' to B' relative to cam 103, which will be seen to have the same outline $a'$ as limit curve $a$ of Fig. 3A.

Further motion of the gun along BC serves to further rotate shaft 85, which thereby attempts to move follower 108. However, follower 108 is now stopped at B' by the operation of the raised portion of cam 103 and accordingly immobilizes member 107 of differential 106. The only way in which shaft 85 can be turned to permit the gun to travel further is by reacting through differential 106 to turn gear 81 and hence to turn elevation control shaft 72. In this manner, the elevation control shaft 72 is turned back in a sense to reduce the speed of the gun. This may be done despite continued displacement of the manual control 12 by virtue of the flexible coupling 73, which permits relative displacement between manual control 12 and elevation control shaft 72 when a predetermined force between these members is exceeded. In this manner, the guns will be decelerated by their own advance and are ultimately stopped, in elevation, at C. Follower 108 remains at B' throughout this action.

If the gun is assumed to move in elevation only, starting downward from a point such as R, it will travel a path RT, follower 108 correspondingly moving along R'T'. If the elevation rate corresponds to the full elevation rate, deceleration will start, in accordance with the action just discussed, when the gun elevation reaches point T, at which time the cam follower is at T' with respect to the cam 103, and engages the working surface of the cam. The cam then applies a force to the follower to turn back the elevation rate control 72 to decelerate the elevation motion of the gun, in the manner just described.

It will be seen that under these conditions the cam follower will also exert a force on the cam tending to rotate the cam away from its position as shown, in this case, tending to rotate the cam to the left in Fig. 3B. If it is assumed that the various gear ratios in the system are so chosen that a predetermined change in elevation will produce the same motion of cam follower 108 as the same change in azimuth produces for cam 103, it will be seen that the amount of force reacting on the cam follower and the amount of force produced on the cam itself will depend upon the slope of the cam curve a' shown in Fig. 3B. If, moreover, flexible couplings 30 and 73 are assumed to have the same stiffness, then the resulting action in the situation described will depend solely upon the slope of the cam curve a'. If this slope is small, the major part of the force will be transmitted back through cam follower 108 and differential 106 to elevation control shaft 72 to stop the elevation motion of the gun. On the other hand, if the cam surface a is relatively steep, the major portion of the force will be transmitted in such manner as to move cam 103 away from its follower 108, thereby reacting through differential 101, whose input member 100 is held stationary by gear 46 and shaft 44, to produce a rotation of its other input member 39, and thereby rotate the azimuth rate control shaft 38. In this manner, even though zero azimuth rate is ordered by the manual control 12, the limit-stop device of the invention serves to set in a definite azimuth rate to actuate the gun, and thereby rotates the gun in azimuth to the right. This azimuth motion of the gun will continue as long as the gun proceeds downward in elevation, gradually decreasing in rate as the gun slows down. The gun thus travels along the path TQL.

The follower 108 forces cam 103 to the left to set in an azimuth rate which will produce an azimuth motion of the gun and cam 103 in a sense to relieve the force applied to the cam by its follower. Thus, as the gun moves, rotation of shaft 46 will permit flexible coupling 30 to return the azimuth rate control shaft 38 back toward the zero rate position, so that in response to the pressure from the follower, the gun servo acts as a follow-up for the cam to position it to relieve the force applied thereto. In this way, cam curve a' is moved to b' (Fig. 3B), and the follower proceeds along T'L' as the gun traverses TQL. At L' the follower can exert no rotational force on the cam, and the gun decelerates to stop at L. It will be noted that gun and follower are again in correspondence at L and L', respectively, as they should be, being at rest at that point. The gun thus finally comes to rest at the point L of the system, where the slopes of the limit curve a and the cam curve a' are perpendicular to the gun and follower motions ordered by the manual control.

It is not absolutely necessary that the gear ratios discussed above be chosen as stated, nor is it necessary that the flexible coupling stiffnesses be identical. Preferably, for an upper turret or lower turret, where this is no limit in azimuth, it is desirable that the motion of the gun in azimuth follow faithfully the ordered motion derived from the manual control, irrespective of the elevational component of position of the gun. That is, when the gun has reached an orientation within the zone in which deceleration must be initiated, it is desirable that such deceleration be initiated substantially only in elevation and that any azimuth rate be left substantially unchanged. By so doing, for example, during tracking with a target, the gun will track with the target in azimuth, while "jumping over" any obstruction as determined by the limit cam device, so that once the interfering obstruction is passed, the gun may still be in track with the target in azimuth. Of course, the fire cut-off device described above will prevent firing of the gun during the periods when the limit-stop device is effective to vary the gun orientation from that ordered or set in by the manual control.

For this purpose, the stiffness of the elevation flexible coupling 73 is made much less than that of the azimuth coupling 30, and the gear ratios are so chosen that the slope of the cam curve a' corresponding to the limit curve a will be fairly small at each point of the curve, so that upon reaching the zone in which deceleration is initiated, where the cam follower and cam come into contact, any reaction will preferably react through the elevation control because of the small slope of the cam curve and the lesser stiffness of its flexible coupling, and will stop or reverse motion in elevation while permitting substantially the full ordered motion in azimuth.

Thus, if the gun is oriented as at point N and if right azimuth rate is ordered, the gun will travel to the right through angle NH until, with the gun at H, follower 108 contacts the working surface of cam 103 at H'. It is to be understood that in Fig. 3B, it is actually the cam which moves, but is indicated as stationary for convenience. Actually a differential control arrangement for follower 108 can be devised whereby cam 103 may be fixed and follower 108 move along two coordinates, if desirable.

Continued rotation of the gun in azimuth will drive through shaft 44, differential 101, whose input member 105 is held stationary by means of the manual control 12, and the stiff flexible coupling 30, to drive cam 103. Because of the superior force exerted by cam 103, follower 108 will be lifted by the rising part of the cam surface and will follow the cam surface curve, such as along H'C'. By so doing, the reaction through differential 106 actuates the elevation rate control shaft 72 to set in the gun elevation rate for controlling the gun to rise over the hump of the limit curve along HC. This will happen irrespective of the ordered elevation rate, which in the present instance is assumed to be zero, by the yielding of the flexible coupling 73 to permit displacement of the elevation rate control shaft 72, no matter what the setting of the manual control 12 in elevation may be. In this way, the gun is continuously controlled in azimuth despite the motion in elevation which carries the gun over the obstruction.

As a further example of the effect of the present system, let it be assumed that the gun is stopped at point C, namely, at a point of highest limit elevation. Under these conditions, follower 108 is at C', corresponding exactly to C. Here any ordered down-elevation rate alone would be ineffective, since follower 108 is immobilized by cam 103, and shaft 85 is immobilized by the stationary gun, so that no rotation of elevation rate control shaft 72 can be produced. Any elevational displacement of control 12 will merely stress the flexible coupling 73.

If it is desired to traverse the curve along CS, it will be clear that at the first instant only right-azimuth rate can be permitted since any down-elevation rate would tend to drive the gun into the fuselage of the craft. However, if elevation rate were not permitted until after the follower had left the limit curve a, it will be clear that azimuth rate would be initially more effective than elevation rate and the resultant curve traced by the gun will be somewhat as shown along CF, and it would not be possible to track the gun along CS.

In order to permit tracing of the curve CS, it is necessary to anticipate the introduction of azimuth rate and permit an elevation rate in response to the setting in of azimuth rate. This feature is incorporated in the present system, since, for example, if full right-azimuth rate is ordered by suitable rotation of the manual control 12, cam 103 will immediately be rotated to the left to b' by an amount proportional to this azimuth rate, and will thereby move away from follower 108, permitting immediately the introduction of at least partial down elevation rate to permit the tracing of curve CS. In effect, cam curve a' is moved over to position b' by the rotation of cam 103, leaving the cam follower in a position which is free with respect to the cam surface, and the desired tracing of curve CS can be effected.

By the present device, therefore, maximum use is made of the structural features of the gun mount by permitting the gun to be oriented toward all points of the celestial sphere made possible by its mounting. In addition, the gun is so controlled that deceleration is initiated at a point in advance of the ultimate stopping point by an amount proportional to the angular velocity of the guns, whereby the same average deceleration with respect to gun position is applied to the gun no matter what its velocity might be.

Furthermore, the variable limit stop device just described permits the gun to always follow the target under the control of the manual control 12 and the gunner at least in one coordinate, even though the control should attempt to actuate the gun into a restricted zone in the other coordinate. In such a case, the second coordinate would be made subservient to the first and control would be maintained only with the first coordinate, thereby assuring maximum facility in regaining tracking with the target after passing over the obstruction causing the operation of the limit stop device.

Also, the limit stop device anticipates the motion of the gun, and permits motion of the gun into regions not possible with other types of control.

Figs. 4 and 5 show the construction of the adjusting or setting differentials 48, 87, 104 and 109 of Fig. 2. Thus, each of these differentials is provided with an input shaft 111 journaled within the supporting housing 112, as by a suitable bearing 113. Pinned or otherwise fixed to input shaft 111 is a pinion 114 which meshes with a further pinion 116 rotatably mounted within a rotatable shell 117 also journaled within housing 112 by suitable bearings 115. Fixed to pinion 116 is a further pinion 118 which meshes with a gear 119 floatingly mounted on input shaft 111. The ratio of gear teeth of pinion 116 to gear 119 is made different from that of pinion 118 to gear 119. Gear 119 is fastened to output gear 121, from which the output motion of the adjusting differential is derived. Also carried by shell 117 is a rack 122 which meshes with gear 119.

In operation, in the position shown, shell 117 is locked to output gear 121 because of the engagement of rack 122 and gear 119. Therefore rotation of input shaft 111 rotates pinion 114 and causes both shell 117 and output gear 121 to rotate at the same speed as input shaft 111 by means of pinions 114 and 116. This is the normal operating condition.

When relative adjustment between input shaft 111 and output gear 121 is desired, shell 117 is moved axially of the device, as by means of a control knob 123, against the opposition of a spring 124. By so doing, rack 122 is disengaged from gear 119 and the device effectively becomes a differential. By now rotating knob 123, and assuming shaft 111 is held stationary, pinion 116 is caused to rotate by being "walked around" pinion 114, thus rotating pinion 118, so that gear 119 and output gear 121 is caused to rotate relative to input shaft 111. Any suitable amount of such adjustment may be made. Then, upon releasing knob 123, rack 122 again becomes engaged with gear 119 and the device effectively interlocks the input shaft 111 and the output gear 121 as before, but relatively displaced by an amount corresponding to the rotation of knob 123. Such adjusting or setting devices may be utilized wherever a direct mechanical coupling is desired, wherein the two parts to be coupled must be adjusted relatively to one another.

In Fig. 6, we have shown one manner in which the limit stop mechanism and controller, hereinbefore described, may be associated with exemplary forms of servo mechanisms for driving the power operated device which is herein illustrated as a gun turret in azimuth and elevation or, in other words, in two relatively angularly disposed frames of movements or along two independent coordinates. Before proceeding with a brief description of Fig. 6, it will be understood that the controller or handle bars may be positioned within the turret or remote from the turret. In the former case, the handle bars and associated servo mechanisms are preferably all contained within the turret. However, for simplicity of illustration, we have illustrated the servo mechanisms and controls therefor as exterior to the turret.

The controller 11, for azimuth control of the turret, operates through a motion transmitting mechanism indicated generally at 150 to drive shaft 34, hereinbefore described (see Fig. 2), which through gears 36 and 37 operates the shaft 38 which operates the control valve of the servo mechanism. For purposes of illustration, we have shown shaft 38 as driving through bevel gears 151, worm 152 and rack 153 to position the valve member 154 of valve 155. Valve 155 is connected with a suitable source of fluid under pressure and with exhaust or a sump to control the operation of a piston 156 within cylinder 157. This latter piston is usually termed a stroke piston since the position thereof controls the stroke or displacement of the pistons within pump 158 illustrated as the A-end of a Vickers drive. The A-end of a drive of this character constitutes a variable displacement, fluid pump which is driven by a suitable motor 159, preferably of a constant speed type, and circulates fluid by means of pipes 160 through the B-end 161 which is a hydraulic motor. For a more detailed disclosure of a variable speed hydraulic transmission of this character and for a more complete showing and explanation of the interior construction of the A-end thereof, attention is invited to U. S. Patent No. 2,177,098, issued to T. B. Doe et al.

Briefly, the operation of the servo system above described is as follows. Angular rotation of control shaft 38 affects a corresponding movement in translation of the valve member 154 which slides within a sleeve 162 which in turn is slidably disposed within the housing of the valve 155. Radial passages in sleeve 162 cooperate with the lands of the valve member 154 to control the flow of fluid under pressure to one side or the other of piston 156 within cylinder 157 and the exhaust of fluid from the opposite side thereof. The follow-up movement of the sleeve to the valve member is produced by the lever 163 which is pivoted at 164 and connected at one end to the piston rod 165 and at the other end to the sleeve. With this arrangement, movement of the valve member 154 in one direction from a central position will cause the stroking piston 156 to move in one direction or the other and, through the medium of lever 163, this motion will be transmitted in some desired ratio to the sleeve 162 which, when the movement is sufficient, closes off communication through the valve 155 thereby holding the stroking piston 156 in the position to which it has been moved. Therefore, the position of stroking piston 156 will be a measure of the output speed of the B-end of the servo mechanism. Likewise, since the position of stroking piston 156 is determined by the degree of rotation of shaft 38, the angle through which shaft 38 is rotated will be a measure of the output rate of the servo.

The B-end of the servo is connected through shaft 166 and suitable gearing 167 to drive the turret 168 and the guns 169 mounted thereon in azimuth. Shaft 44, hereinabove described, which feeds into the two differentials 42 and 101 of the fire cutoff and limit stop mechanisms is connected with the output of the B-end of the servo through suitable shafts and gearing indicated generally at 170.

In the embodiment illustrated, the azimuth servo, above described, drives the turret and guns in azimuth about an axis normal to the paper as viewed in Fig. 6. The two guns are mounted within the turret for movements in elevation about the axis represented by the dot-dash line 171 and the elevation servo system described in the following and which may be generally similar to the azimuth system functions to drive the guns in elevation.

The elevation servo system is also controlled from the manual controller 11 through the transmission 172 which may be similar to transmission 150 and each thereof may respectively comprise the elements shown in Fig. 2, above described, and connecting the manual controller with the shafts 38 and 72. The shaft 72 is connected to operate a valve 173 which may correspond to valve 155 which in turn controls the stroking piston within the cylinder 174. The A-end of the elevation servo 175 is operated by motor 176 and controlled by its associated stroking piston, in turn, to operate and control the speed of the output of the B-end 177. The output of the B-end is connected through the shaft 178 and suitable gearing 179 to drive the guns in elevation, and the shaft 85 feeding into the two differentials 79 and 106, shown in Fig. 2 and above described, is connected to the output of the B-end 177 through suitable shafting and gears indicated generally at 180.

Although the gun turret of the present invention has been specifically described as aircraftborne, it is to be understood that the present invention may also be used in other types of installations, such as on tanks, trucks, ships, etc., wherever fire cut-off and limit stop devices are necessary or desirable.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. A limit stop mechanism for a power-operated device operable along two coordinates, comprising a manual controller independently displaceable in two modes, means responsive to respective displacements of said controller for producing respective speeds of said device along respective independent coordinates, means responsive to predetermined values of one of the coordinates of the position of said device for decelerating and stopping said device along said one coordinate, and means for advancing the initiation of said decelerating action in accordance with a component of the speed of said device along the other coordinate.

2. A limit-stop mechanism for a power-operated device, comprising a manual controller independently displaceable in two modes, means responsive to displacement of said controller along one of said modes for driving said device along a first coordinate at a speed corresponding to said displacement, means responsive to displacement of said controller along the other of said modes for driving said device along a second independent coordinate at a speed corresponding to said second displacement, a first movable member, a second movable member, each of said members being adapted to form a stop for the other member, means for driving said first member in correspondence with said device along one of said coordinates, means for driving said second member in correspondence with said device along the other of said coordinates, means for advancing the position of said first member in accordance with the speed of said device along said one coordinate, means for advancing the position of said second member in accordance with the speed of said device along the other of said coordinates, and means responsive to engagement of said two members for decreasing the speed of said device along respective coordinates, whereby said device is decelerated, said deceleration being thereby effected earlier for higher speeds of said device.

3. A limit-stop mechanism for a power-operated device movable in two coordinates, comprising a manual controller, means for driving said device along one of said coordinates at a speed corresponding to displacement of said controller, means responsive to the attainment of a predetermined position of said device along said one coordinate for decelerating said device, and means responsive to initiation of said decelerating action for affecting the motion of said device along the other of said coordinates.

4. A limit-stop mechanism as in claim 2, further comprising means responsive to the initiation of said deceleration along one of said coordinates for varying the speed of said device along the other of said coordinates.

5. A limit stop mechanism for a power operated device comprising a manually operable controller, means responsive to displacement of said controller for actuating said device at a speed corresponding to said displacement, and means, including differential gearing, responsive to the position of said device for actuating said controller to restrict the speed of said device to predetermined position-dependent speeds, upon positioning of said device within a predetermined region.

6. A limit stop mechanism for a power operated device comprising a manually operable controller, means responsive to displacement of said controller in one direction for actuating said device at a speed corresponding to said displacement in a first direction, means responsive to displacement of said controller in a second direction for actuating said device in a second direction at a speed corresponding to said displacement in said second direction, a movable member, means for actuating said member in accordance with movements of said device in said first direction and in accordance with movement of said controller in said first direction, a stop for said movable member, means for positioning said stop in accordance with movement of said device in said second direction, said actuating means being operable through engagement of said stop by said movable member to return said controller towards its zero speed position, whereby said device is decelerated, said deceleration being thereby effected earlier for high speeds of said device.

7. A limit stop mechanism for a power operated device comprising a manually operable controller, means responsive to displacement of said controller for actuating said device at a speed corresponding to said displacement, a movable member, a fixed stop for said movable member, and means including differential gearing interconnecting said controller, said device, and said movable member, whereby said device is restricted to predetermined position dependent speeds upon positioning of said device within predetermined limits.

8. A limit stop mechanism for a power operated device comprising manually operable control means, means for driving said device along each of two independent coordinates at a speed corresponding to the displacement of said control means along the corresponding coordinates, and means responsive to the position and speed of said device along the first of said coordinates and to the position of said device along the second of said coordinates for affecting the speed of said device along said second coordinate.

9. A limit stop mechanism for a power operated device comprising manually operable control means, means for driving said device along each of two independent coordinates at a speed corresponding to the displacement of said control means along the corresponding coordinates, and means responsive to the position and speed of said device along one of said coordinates and to the position of said device along the other coordinate for affecting the speed of said device along both coordinates.

10. A limit stop mechanism for a power operated device comprising manually operable control means, means for driving said device along each of two independent coordinates at a speed corresponding to the displacement of said control means along the corresponding coordinates, and means responsive to the position and speed of said device along both of said coordinates for affecting the speed of said device along one of said coordinates.

11. A limit stop mechanism for a power operated device comprising a manually operable controller, means for driving said device along each of two independent coordinates at a speed corresponding to the displacement of said controller along the corresponding coordinates, and means responsive to the position and speed of said device along both of said coordinates for affecting the speed of said device along both of said coordinates.

12. A limit stop mechanism for a power operated device supported to move in two relatively angularly disposed frames of movement, means for driving said device in a first of said two frames of movement, control means for controlling the speed at which said device is driven, and means responsive to the position and speed of said device in both of said frames of movement for affecting the speed of said device in said first frame of movement.

13. A limit stop mechanism for a power operated device supported to move in two relatively angularly disposed frames of movement, driving means for driving said devices in a first of said frames of movement, control means for controlling the speed at which said device is driven, and means responsive to the speed of said device in said second frame for controlling the speed thereof in said first frame.

14. A limit stop mechanism for a power operated device supported to move in two relatively angularly disposed frames of movement, driving means for driving said device in a first of said frames of movement, control means for controlling the speed at which said device is driven, and means responsive to the speed of said device in said first frame and to the position of said device in said second frame for controlling the speed thereof in said first frame.

15. A limit stop mechanism for a power operated device supported to move in two relatively angularly disposed frames of movement, driving means for driving said device in a first of said frames of movement, control means for controlling the speed at which said device is driven, and means responsive to the position and speed of said device in both of said frames for controlling the speed thereof in said first frame.

16. A limit stop mechanism for a power operated device supported to move in two relatively angularly disposed frames of movement, means for driving said device in a first of said frames of movement, a displaceable control element for controlling the speed of said device in said first frame, the position of said control element being a measure of said speed, and means cooperable with said control element and responsive to the speed of said device in said second frame for controlling the speed of said device in said first frame.

17. A limit stop mechanism for a power operated device comprising a pair of means for driving said device along, respectively, two independent coordinates, means for controlling the speeds at which said device is operated, and means responsive to the position and speed of said device along both of said coordinates for affecting the speed of said device along both of said coordinates.

18. A limit stop mechanism for a power operated device comprising means for driving said device along each of two independent coordinates, means for controlling the speeds at which said device is operated, and means responsive to the position and speed of said device along a first of said coordinates and to the position of said device along a second of said coordinates for affecting the speed of said device along said second coordinate.

19. A limit stop mechanism for a power operated device supported to move in two relatively angularly disposed frames of movement, means for driving said device in a first of said frames of movement, means for controlling the speed of said device, a cam, means operatively connecting said cam with said speed control means and with said device to position said cam in accordance with the speed and position of said device in said first frame, a cam-engaging member, and means for positioning said member in accordance with the position of said device in said second frame of movement whereby the speed of said device in said first frame may depend upon the position of said device in said second frame.

20. A limit stop mechanism for a power operated device supported to move in two relatively angularly disposed frames of movement, means for driving said device in a first of said frames of movement, a speed control member for controlling the speed of said driving means, a cam, means connecting said cam with said speed control member to position said cam in accordance with the speed of said driving means, a cam-engaging member and means for positioning said cam-engaging member in accordance with the position of said device in the second frame of movement whereby the speed of said driving means may depend upon the position of said device in said second frame of movement.

21. A limit stop mechanism for a power-operated device operable along two coordinates, comprising a manual controller independently displaceable in two modes, means responsive to respective displacements of said controller for producing respective speeds of said device along respective independent coordinates, means responsive to predetermined values of one of the coordinates of the position of said device for decelerating and stopping said device along said one coordinate, means for advancing the initiation of said decelerating action in accordance with a component of the speed of said device along said one coordinate, and means responsive to the initiation of said deceleration along said one coordinate for varying the speed of said device along the other of said coordinates.

FREDERIC M. WATKINS.
CHARLES N. SCHUH, JR.

REFERENCES CITED

The following references are of record in the file of this patent:

UNITED STATES PATENTS

| Number | Name | Date |
|---|---|---|
| 981,806 | Smith | Jan. 17, 1911 |
| 1,651,699 | Halsey | Dec. 6, 1927 |
| 1,951,921 | Blanchard | Mar. 20, 1934 |
| 2,245,075 | Mingle | June 10, 1941 |
| 2,304,566 | Haberlin | Dec. 8, 1942 |

FOREIGN PATENTS

| Number | Country | Date |
|---|---|---|
| 489,208 | Great Britain | July 21, 1938 |

---

Certificate of Correction

Patent No. 2,434,654.

January 20, 1948.

FREDERIC M. WATKINS ET AL.

It is hereby certified that errors appear in the printed specification of the above numbered patent requiring correction as follows: Column 13, line 59, for "position b" read *position b'*; column 14, line 33, after the word "hit" insert *the*; column 16, line 4, strike out "this" and insert instead *there*; and that the said Letters Patent should be read with these corrections therein that the same may conform to the record of the case in the Patent Office.

Signed and sealed this 4th day of May, A. D. 1948.

[SEAL]

THOMAS F. MURPHY,
*Assistant Commissioner of Patents.*